United States Patent
Bigelow et al.

(12)
(10) Patent No.: US 7,037,202 B2
(45) Date of Patent: May 2, 2006

(54) RIGID BENT BAR SELF-SUPPORTING CV JOINT

(76) Inventors: Vaughn Bigelow, 353 Caribou Pass Cir., Lafayette, CO (US) 80026; Marvin Hoffman, 7917 Co Rd. 4W SW., Alexandria, MN (US) 56308

( * ) Notice: Subject to any disclaimer, the term of this patent is extended or adjusted under 35 U.S.C. 154(b) by 0 days.

(21) Appl. No.: 10/396,736

(22) Filed: Mar. 25, 2003

(65) Prior Publication Data

US 2004/0192446 A1 Sep. 30, 2004

(51) Int. Cl.
*F16D 3/08* (2006.01)

(52) U.S. Cl. .......................................... 464/50; 464/905
(58) Field of Classification Search .................. 464/50, 464/112–114, 117–119, 137, 138, 904, 905
See application file for complete search history.

(56) References Cited

U.S. PATENT DOCUMENTS

| 730,604 | A | | 6/1903 | Brazier | |
| 899,534 | A | | 9/1908 | Hoffman | |
| 3,075,368 | A | * | 1/1963 | Hulse | 464/114 |
| 4,080,804 | A | * | 3/1978 | Falk | 464/114 |
| 4,271,685 | A | | 6/1981 | Lindenthal et al. | 64/17 |
| 5,094,651 | A | | 3/1992 | Cornay | 464/12 |
| 5,277,659 | A | | 1/1994 | Cornay | 464/12 |
| 5,425,676 | A | | 6/1995 | Cornay | 464/11 |
| 5,823,881 | A | | 10/1998 | Cornay | 464/118 |
| 5,964,664 | A | * | 10/1999 | Cook et al. | 464/117 |
| 6,024,645 | A | * | 2/2000 | Tomaru et al. | 464/118 |
| 6,251,020 | B1 | | 6/2001 | Cornay | 464/117 |

* cited by examiner

*Primary Examiner*—Kenn Thompson
(74) *Attorney, Agent, or Firm*—Marsh Fischmann & Breyfogle LLP

(57) ABSTRACT

A torque transfer device is disclosed that utilizes one or more universal joints to transfer rotary motion between first and second shafts that rotate about non-aligned axes of rotation. The torque transfer device maintains these rotational axes at a fixed angle while allowing the shafts to freely rotate. In order to maintain the rotational axes of the shafts at a fixed angle relative to one another, a stabilizer is utilized. In one embodiment, first and second sections of the stabilizer, which are disposed at a desired angle to one another, are disposed within central bores of the first and second shafts. In this embodiment, the first and second shafts are interconnected with a ring-type universal joint. The ring type universal joint allows the stabilizer to pass between the central bores of the two shafts without interfering with the operation of the joint connecting the two shafts.

27 Claims, 7 Drawing Sheets

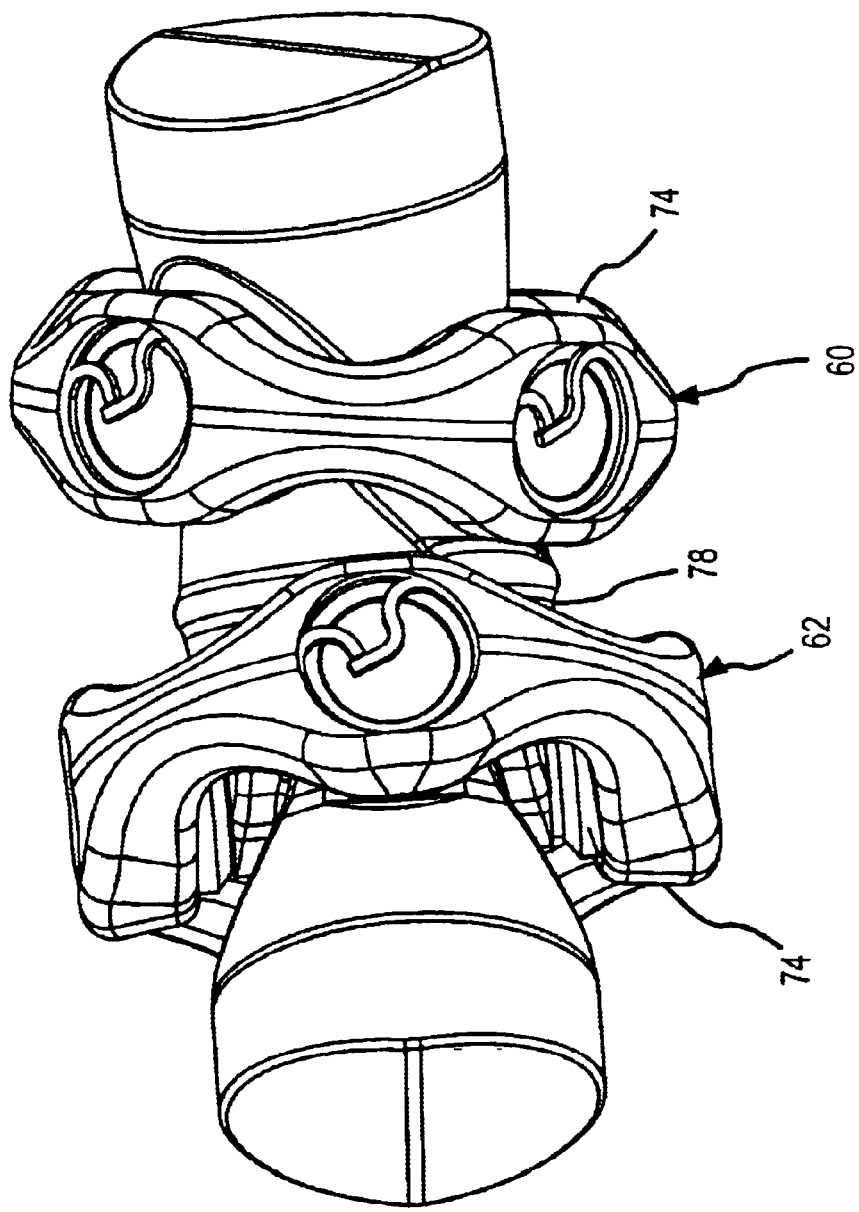

RIGID BENT BAR SELF-SUPPORTING CV JOINT

FIELD OF THE INVENTION

The present invention relates to torque transfer devices for transferring rotary motion and associated torque from a first shaft to a second shaft when those shafts are disposed at an angle relative to one another. In particular, the present invention relates to torque transfer devices that transfer torque between first and second shafts that remain disposed at a fixed angle relative to one another during operation.

BACKGROUND

Torque transfer devices generally involve two or more shafts interconnected to transfer rotary power (i.e., torque) from a power source to an output. Devices that allow for transfer of torque between two shafts disposed at an angle to one another may be referred to as angular linkages. Such angular linkages include, for example, gear boxes and joints. Gearboxes generally include a first gear rotationally fixed to an input shaft and a second gear rotationally fixed to an output shaft. The first gear and second gear are directly or indirectly linked to form a gear train for transferring torque between the input and output shafts. Gearboxes have a number of desirable attributes, including smoothness of operation and the ability to employ a clutch mechanism to selectively disengage the gears.

Joints typically employ pins to rotationally couple structure associated with an input shaft to structure associated with an output shaft. A variety of joint structures including yokes, balls, intermediate shafts and the like may be employed in this regard. The attributes of joints often include: the ability to withstand high torque environments without slipping; compact, robust and inexpensive construction; and, in some cases, the ability to accommodate varying input shaft/output shaft geometries. Examples of common joint types include universal joints (U-joints) and constant velocity joints (CV joints).

Automobile drive linkages typically involve a number of joints. For example, one or more universal joints may be utilized for transferring power from a transmission to the wheels of an automobile. In this case, the universal joint(s) may allow for the transfer of power between the transmission and the wheels via one or more shafts that are not necessarily linearly aligned. Typically, in addition to transferring power between non-aligned shafts, it is desirable for such universal joints to permit movement between two rotating shafts to accommodate changes in the operating environment. For example, as the suspension of an automobile operates (e.g., compresses or otherwise travels), the angle between two interconnected shafts of a mechanical linkage may change.

Conversely, many other applications exist where rotary power is transferred and while a constant angle is maintained between two or more rotating shafts associated with a joint. For example, the transfer of rotary power between a transmission and the propeller of a motorized boat often is performed at a constant angle that does not change during operation. That is, torque is transferred between first and second shafts that are disposed at a fixed angle relative to one another. In such instances it may still be desirable to utilize a torque transfer device that incorporates a universal joint to transfer power due to the simplicity and/or reduced cost of the device as compared to, for example, a gearbox.

While providing a simplified, cost-effective means to transfer power between rotating shafts, torque transfer devices that utilize universal joints suffer from several problems. For example, two shafts interconnected by a universal joint generally do not rotate at the same speed throughout a rotation cycle when the shafts are at an angle to one another. Though each shaft completes one revolution in the same time as the other shaft, the relative speeds of the two shafts vary during rotation. In this regard, an input shaft driven by a power source may rotate at a constant velocity. However, an output shaft interconnected to the input shaft via a universal joint will, during each rotation, typically rotate faster than the input shaft in four instances, rotate slower than the input shaft in four instances, and rotate at the same velocity as the input shaft in four instances. This can create major problems where shaft speed is high or if the load on the shafts is high. The problem is particularly pronounced where both high speed and high load conditions are present.

In order to alleviate this non-constant rotation of the output shaft relative to the input shaft, an intermediate shaft may be utilized. In this regard, the input and output shafts are interconnected to the intermediate shaft via first and second universal joints. When the input and output shafts are held in a strict geometric relationship (i.e., at equal angles relative to the intermediate shaft and in a common plane), the output shaft rotates at a substantially constant angular velocity relative to the input shaft. In this regard, the intermediate shaft still rotates at a non-constant angular velocity relative to the input shaft, and the output shaft rotates at a non-constant angular velocity relative to the intermediate shaft, but these effects tend to cancel each other out such that the output shaft rotates at a substantially constant angular velocity with the input shaft.

While solving the non-constant velocity rotation problem, utilization of a double joint and an intermediate shaft requires the shafts be supported in a strict geometrical relationship. Furthermore, utilization of dual universal joints and an intermediate shaft results in an enlarged joint and may introduce increased vibration into a system.

SUMMARY OF THE INVENTION

It is therefore an object of the present invention to provide an improved torque transfer device for fixed angle applications.

It is a further objective to provide a self-supporting fixed angle torque transfer device operable at a constant velocity.

Another objective of the present invention is to provide a torque transfer device having reduced vibration.

The present invention is directed towards a torque transfer device for transferring rotary power from a first shaft to a second shaft. In particular, the torque transfer device utilizes a joint to physically interconnect first and second shafts in a manner that allows the shafts to be disposed at an angle relative to one another while still being able to rotate. Various aspects of the invention are directed at providing a joint-based torque transfer device that is more compact, simple, and robust than existing devices. In any aspect, it will be appreciated that the torque transfer device may be utilized in mechanical linkage systems where multiple torque transfer devices are utilized and/or in linkage systems with existing torque transfer devices (e.g., flexible universal joints).

According to a first aspect of the present invention, a self-supporting torque transfer device is provided that includes first and second shafts that are physically connected utilizing a joint that allows the first and second shaft to rotate about first and second axes of rotation that are disposed at an angle relative to one another. Accordingly, The first and second shafts may each be interconnected to, for example, power sources, power outputs and/or other shafts. Furthermore, the torque transfer device includes a rigid stabilizer extending between the first and second shafts that includes a first section coupled to the first shaft and a second section coupled to the second shaft for maintaining the first and second shafts in a substantially fixed positional relationship. That is, while being able to rotate about individual axis that are disposed at an angle relative to one another, the rigid stabilizer prevents the first and second shafts from otherwise moving relative to one another. In this regard, the torque transfer device provides the means for transferring rotary power at an angle wherein the joint utilized to connect the first and second shafts is fixed and self-supporting.

The joint utilized to interconnect the first and second shafts may comprise any joint that is operable to translate rotary motion from a first rotating shaft to a second rotating shaft wherein the shafts are disposed at an angle. That is, any angular linkage may be utilized, including gears disposed around the outer perimeter of each shaft as well as universal joint arrangements utilized to form a rotary joint interconnecting the first and second shafts. Such universal joints may include ring and pin joints, cruciform-type joints, and ball and cage joints.

The rigid stabilizer may be coupled to the first and second shafts in any manner that maintains these shafts in a fixed positional relationship while allowing the shafts to rotate about their respective axis of rotation. In this regard, the rigid stabilizer is not fixedly interconnected to either of the shafts. For example, the stabilizer may be in a floating relationship with the shafts or coupled to the shafts utilizing bearing assemblies that permit rotation. In any case, the rigid stabilizer is coupled to the first and second shafts in a manner that prevents the angle formed between the shafts from changing while still allowing the shafts to freely rotate. More particularly, the stabilizer maintains the shafts in a fixed positional relationship.

For example, the rigid stabilizer may comprise a sleeve-type arrangement situated around an outside portion of each shaft, and coupled to the shaft utilizing, for example, bearing assemblies that allow the shafts to rotate. In this regard, the structure of the sleeve would provide support to maintain the shafts in the fixed positional relationship. Furthermore, the rigid stabilizer will not generally be interconnected to an outside reference point for maintaining the first and second shafts in the fixed positional relationship. That is, the structure of the rigid stabilizer prevents non-rotational movements between the shafts.

In another embodiment, the rigid stabilizer is disposed within a portion of each of the first and second shafts. That is, an internal stabilizer is utilized wherein a first portion of the rigid stabilizer extends into a portion of the first shaft (e.g., along the axis of rotation) while a second portion of the rigid stabilizer extends into a portion of the second shaft. In this embodiment, first and second sections of the rigid stabilizer may be interconnected at a fixed angle within an acceptable operating range of the joint. For example, the rigid stabilizer may be a solid bar bent to a desired angle. Accordingly, the rigid stabilizer maintains the first and second shafts at this bend angle.

In the embodiment utilizing the internal rigid stabilizer, the first and second shafts will necessarily include internal bores for receiving sections of the rigid stabilizer. The bores may be formed to receive the sections of the stabilizer in a concentric relationship to reduce vibration. Furthermore, the bores may include bearings assemblies to provide for enhanced rotation between the shafts and the rigid stabilizer. These bearing assemblies may include, without limitation ball bearings, needle bearings, elliptical bearings, sleeve bearings and bushing assemblies. In any case, in a preferred embodiment, the bores, bearings, and sections of the stabilizer disposed within each of the shafts are sized such that substantially no lateral or axial movement (i.e., non-rotational) is permitted between the rigid stabilizer and the shafts. As will be appreciated, disposition of the rigid stabilizer within a portion of each shaft may substantially reduce vibration in the joint caused by the shafts rotating. Accordingly, incorporation of the internal stabilizer may provide for enhanced smoothness of operation.

The rigid stabilizer may be designed such that it is able to bear substantial forces between the first and second shafts, thereby providing a fixed angle torque transfer device that may be stronger than similar devices that do not incorporate a stabilizer. For example, the internal stabilizer may be formed of a single solid bar or a thick walled tube. Typically, the rigid stabilizer will be formed of a metal for rigidity and wear purposes; however, other materials (e.g., plastics, composites, alloys etc.) may also be utilized. In any case, it is preferred that the stabilizer be operative to relieve the joint interconnecting the first and second shafts of non-rotational forces acting upon the torque transfer device (e.g., bending moments between shafts). In this regard, a more compact torque transfer device may be utilized in some instances without affecting the strength of the joint.

According to a second aspect of the present invention, a fixed angle torque transfer device is provided that allows for constant velocity torque transfer between an input shaft and an output shaft. In this regard, the constant velocity torque transfer device comprises an input shaft and an output shaft interconnected to one another via an intermediate shaft. That is, a first end of the intermediate shaft is physically interconnected to the input shaft and the second end of the intermediate shaft is physically interconnected to the output shaft. Each interconnection is made utilizing a joint operable to transfer rotary motion between shafts having non-aligned axes of rotation. The use of the intermediate shaft allows the input and output shafts to rotate at a constant velocity relative to one another while the intermediate shaft may experience non-constant velocity rotation. Additionally, a rigid stabilizer is utilized with the constant velocity torque transfer device. The rigid stabilizer has a first section coupled with the input shaft, a second section coupled with the output shaft, and a third section coupled to the intermediate shaft. Accordingly, the rigid stabilizer maintains the input, output, and intermediate shafts in a fixed positional relationship to one another. In order to produce a constant velocity joint, the rigid stabilizer may maintain the input and output shafts at equal angles relative to the intermediate shaft. That is, the rigid stabilizer may maintain the three shafts in a strict geometric relationship required to produce a constant velocity joint.

Variations and refinements may exist to the second aspect of the present invention. For example, the present aspect may utilize ring and pin universal joints, cruciform-type universal joints, or ball and cage joints to interconnect the various shafts. Typically, a ring and pin type universal joint is utilized as its structure readily allows for an internal stabilizer to be utilized with the constant velocity torque transfer device. That is, use of a ring and pin type joint allows a stabilizer to pass between the various shafts without interfering with operation of the joint.

Where an internal stabilizer is utilized, a first section of the stabilizer is disposed within an internal bore of the input shaft and a second section of the stabilizer is disposed within an internal bore of the output shaft. Accordingly, the first and second sections are interconnected to a central section of the stabilizer that is disposed through an internal bore of the intermediate shaft. Preferably, the first and second sections connected to the intermediate section at equal angles in a common plane in order to produce a constant velocity torque transfer device. Again, as in the first aspect, varying bearing assemblies may be incorporated with the internal stabilizer to allow for enhanced rotation.

The internal rigid stabilizer may be formed in some embodiments as a one-piece unit (e.g. a solid bar bent to a desired angle). Alternatively, the rigid stabilizer may be formed in separate releasably interconnectable sections. For example, the sections of the rigid stabilizer disposed in separate shafts may be individual bars which interconnect to one another to form a rigid stabilizer. In a preferred embodiment, the releasably interconnectable sections may be formed to interconnect at selectable angles prior to their insertion within the shafts. In this regard, the torque transfer device may be utilized to maintain first and second shafts at a fixed angle relative to one another. However, this angle may be adjusted to fit the needs of a particular application.

Utilization of a dual joint torque transfer device (i.e., incorporation of the intermediate shaft) to interconnect the input and output shafts provides an additional benefit, namely, an increased allowable operating angle between the input and output shafts. As will be appreciated, a single joint interconnecting the input and output shafts may allow for a operating angle between the shafts in excess of 45° or more depending on the joint utilized. In contrast, a dual joint torque transfer device may allow for operating angles between the shafts in excess of 90° or more. (i.e. twice that allowed by a single joint torque transfer device).

According to a third aspect of the present invention, a torque transfer device is provided that allows for providing constant velocity torque transfer while minimizing the size of the joint utilized. In order to create a constant velocity torque transfer device, the intermediate shaft typically requires two universal joints to interconnect the various shafts. As will be appreciated, inclusion of the intermediate shaft necessarily requires that the torque transfer device be larger than a torque transfer device that does not include an intermediate shaft. In order to minimize the length of the intermediate shaft, the torque transfer device of the third aspect utilizes an intermediate shaft having a first end interconnected to an input shaft using a first universal joint along a first pivot axis and having a second end interconnected to an output shaft, using a second universal joint along a second pivot axis. For example, each end of the intermediate shaft may be formed as a Y-shaped or T-shaped yoke wherein the respective universal joint interconnects the arms of each yoke forming the respective pivot axis. As will be appreciated, most universal joints utilize four equally spaced interconnections to attach two shafts about two perpendicular axes. That is, two opposing surfaces of a first shaft (e.g., a first yoke on the intermediate shaft) are interconnected about a first pivot axis and two opposing surfaces of a second shaft (e.g. a yoke on the input shaft) are interconnected about a second perpendicular axis. If an intermediate shaft is interconnected to two shafts (e.g. an input and output shaft on each end), the four interconnecting points of each connecting joint may be disposed towards one another during rotation. Accordingly, this requires that the intermediate shaft be of a minimum length to allow clearance between these interconnection points. In the present aspect, the first and second ends of the intermediate shaft are connectable to their respective universal joints about pivot axis that are rotated at a non-zero acute angle to one another. For example, yokes on either end of the intermediate shaft may be twisted relative to one another. In a preferred embodiment, these pivot axes are rotated at a 45° angle to one another. In this regard, during rotation the interconnection points of the respective universal joints on either end of the intermediate shaft may be alternated thereby allowing the intermediate shaft to be shorter in comparison with a standard intermediate shaft, while still allowing the interconnecting points of the universal joints to clear one another during rotation.

The joints utilized to interconnect the torque transfer device of the third aspect may be cruciform-type universal joints or ring and pin type universal joints. In either case, these universal joints may be formed such that they allow closer disposition to one another during rotation. For example, ring and pin type joints utilize a ring structure interconnected by two perpendicular axes to each shaft, wherein the ring is disposed around the outside surface of each shaft. In order to accommodate enhanced disposition towards one another, these rings may be formed with recesses between the interconnection points. In this regard, during rotation the interconnection points of the ring interconnecting input shaft to the intermediate shaft may be disposed within corresponding depressions on the ring interconnecting the intermediate shaft to the output shaft. In this regard, the constant velocity torque transfer device having a reduced overall dimension may be provided. Accordingly, the stabilizing bar may be incorporated within this aspect thereby allowing a reduced size, enhanced strength constant velocity torque transfer device.

BRIEF DESCRIPTION OF THE DRAWINGS

FIG. 5 shows a perspective view of a second torque transfer device.

DETAILED DESCRIPTION

The present invention is directed to a compact, simple and robust torque transfer device utilized to transfer rotary power from a first rotating shaft to a second rotating shaft. The invention is applicable to a variety of rotary power transfer applications and may be utilized in any of a variety of environments where it is desirable to transfer power between a power source and a power output including at least one set of linkage elements that are not directly aligned. In the following description, the invention is set forth in the context of a joint-based torque transfer device for fixed angle applications. It will be appreciated, however, that certain aspects of the invention are not limited to such applications.

In the embodiment first described below, to accommodate non-alignment, the torque transfer device utilizes two or more shafts interconnected by a universal joint. However, since the device is designed for use in fixed angle applications, freedom of relative movement between the shafts is not required. In this regard, the first embodiment utilizes a rigid stabilizer disposed within a portion of each shaft that substantially prevents these shafts from changing angles relative to one another while still allowing the shafts to rotate about fixed axes. The stabilizer, in addition to preventing relative movement between the shafts, can be utilized to support the shafts in a strict geometrical relationship that allows for the torque transfer device to operate at constant velocities, as will be discussed herein.

In the following description, the embodiments of angular linkage devices provided are constant velocity devices that utilize an input and output shaft interconnected by an intermediate shaft, wherein the input and output shafts are interconnected to the intermediate shaft utilizing two universal joints. Though each embodiment discussed herein utilizes two universal joints and an intermediate shaft, it is to be understood that certain aspects of the invention are applicable to direct connection of two shafts by a single universal joint. Furthermore, as shown in the embodiments herein, the universal joint utilized to interconnect the various shafts is a ring and pin-type universal joint. However, other universal joint designs (e.g., ball and cage, cruciform) may also be utilized to interconnect the respective shafts in accordance with the present invention.

Figure 1:
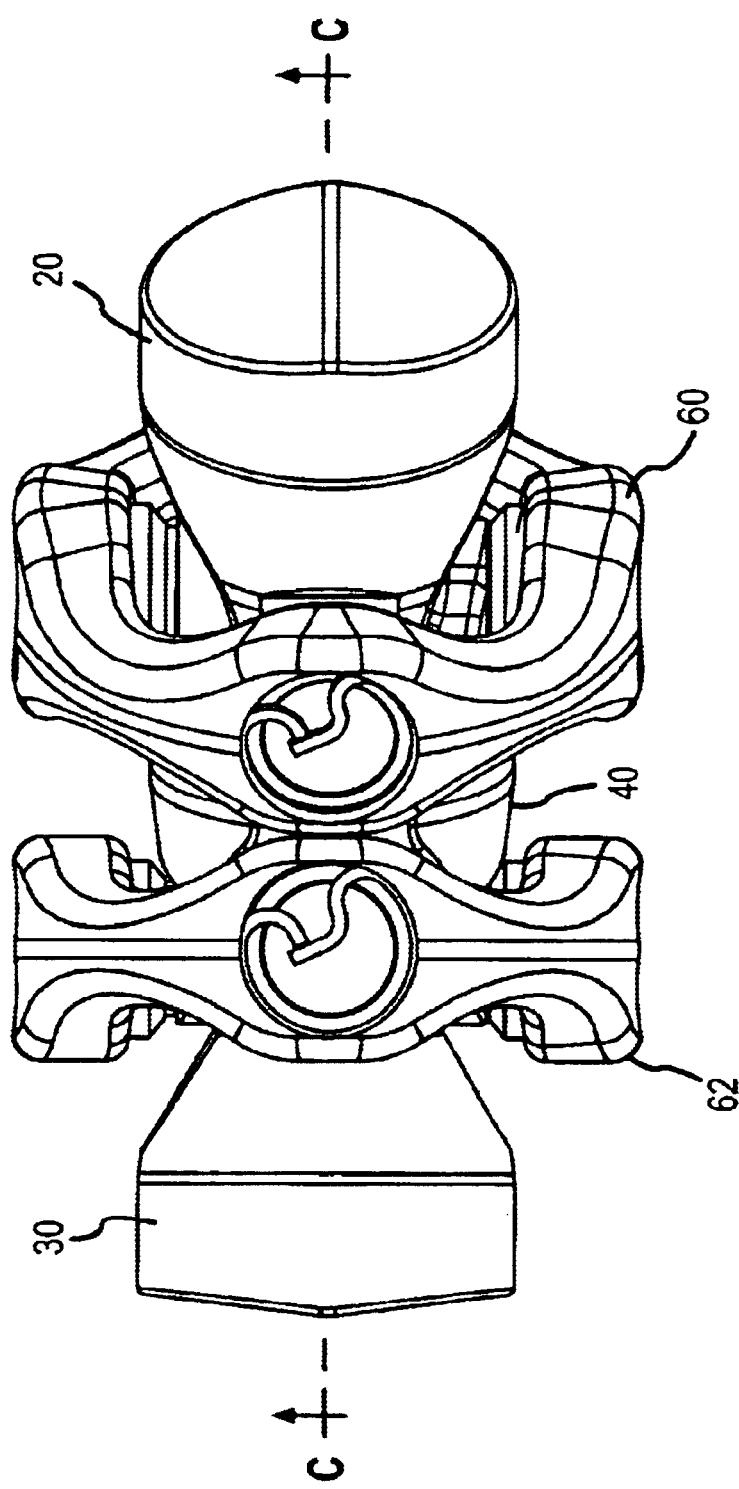
FIG. 1 shows a perspective view of a first torque transfer device.
Figure 2:
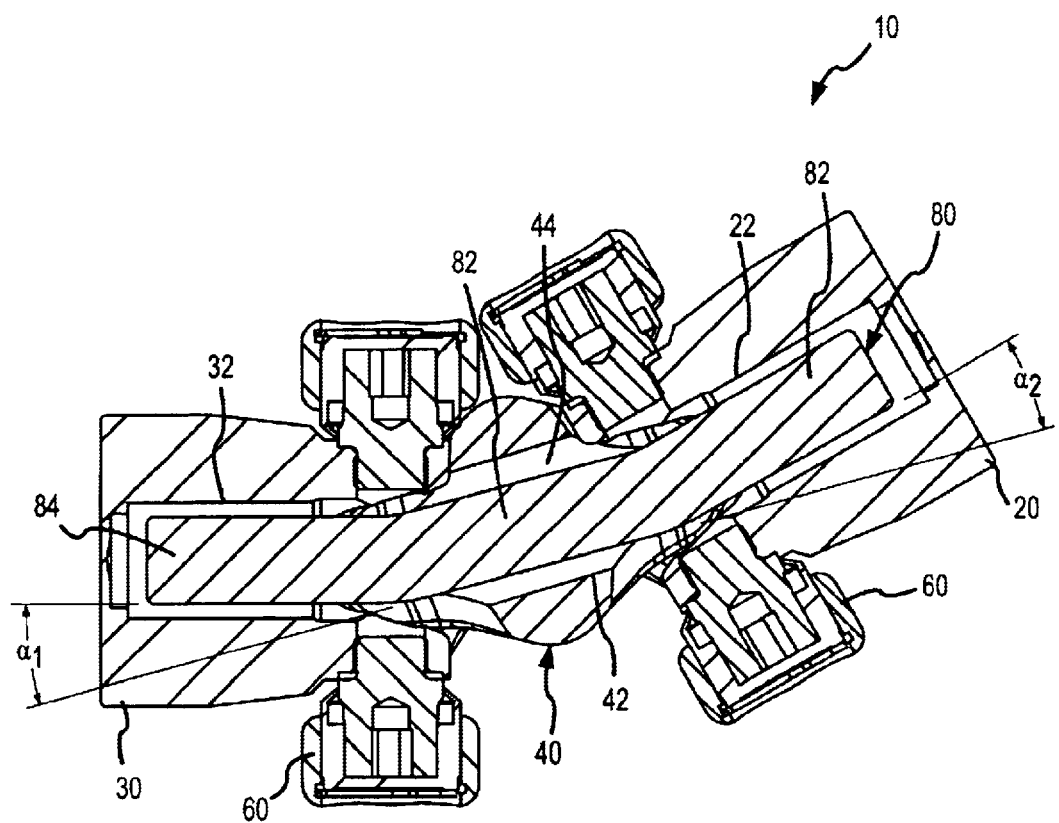
FIG. 2 shows a cross-sectional view of the torque transfer device of FIG. 1.
Figure 3:
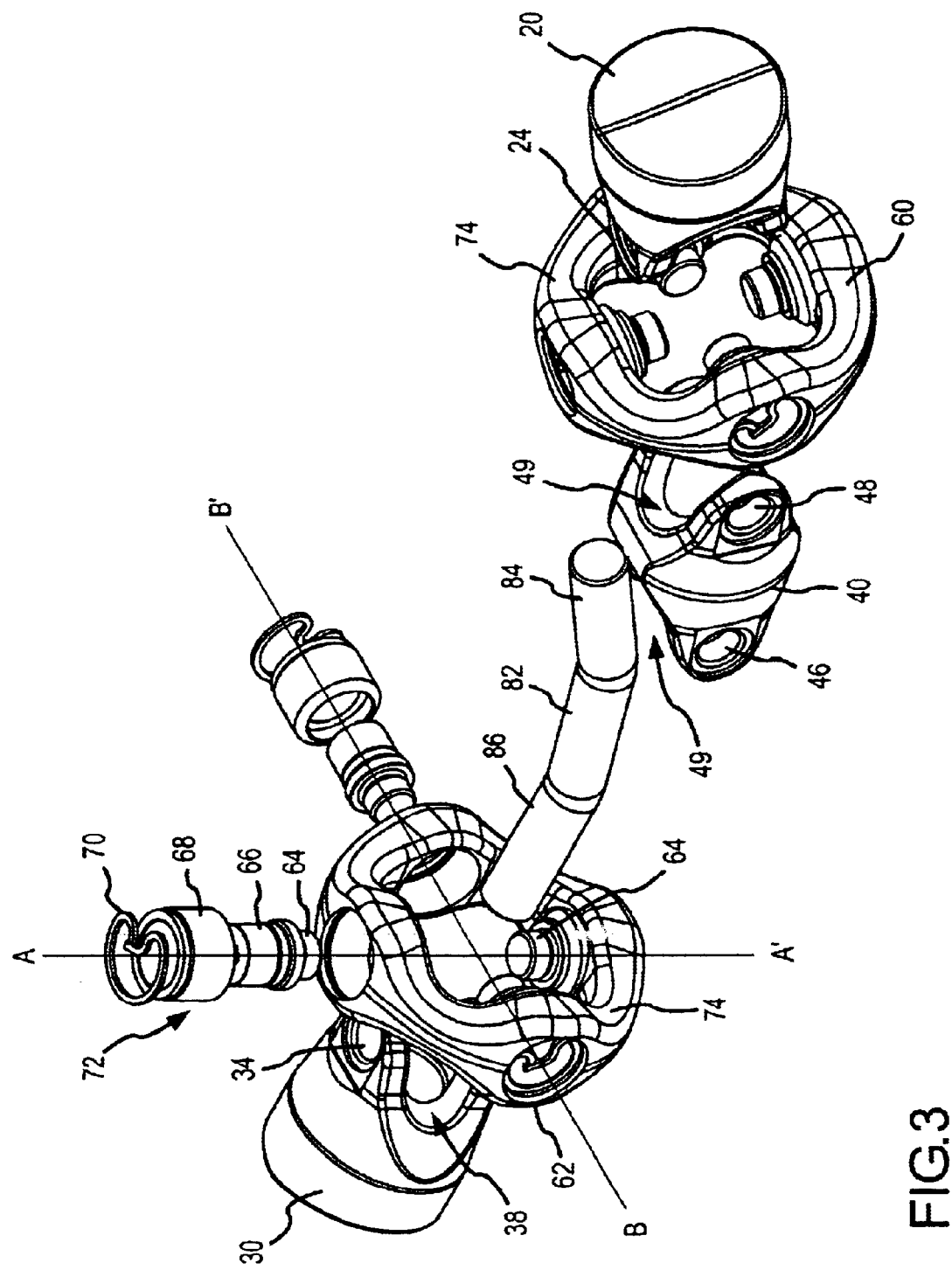
FIG. 3 shows an exploded view of the torque transfer device of FIG. 1.

FIGS. 1, 2, and 3 show a first embodiment of the present invention, wherein an internal stabilizing bar 80 is utilized to create a fixed angle self-supporting torque transfer device 10. As shown in FIG. 1, the torque transfer device 10 comprises a first drive shaft 20 interconnected to a second drive shaft 30, via an intermediate shaft 40 and two ring and pin type universal joints 60, 62 (hereinafter "universal joints"). More particularly, the first drive shaft 20 is interconnected to a first end of the intermediate shaft 40 by a first universal joint 60 and a second drive shaft 30 is interconnected to an opposing end of the intermediate shaft 40 by a second universal joint 62.

Referring briefly to FIG. 3, it will be noted that each universal joint 60, 62 is generally defined by a ring member 74 having four equally spaced bearing apertures 76 disposed about its outside perimeter, which each extend through the ring member 74. Each bearing aperture 76 is operable to receive a bearing assembly 72 which includes a bearing cap 68, needle bearings 66, and a retaining clip 70 for maintaining the bearing assembly 72 within the bearing aperture 76. The bearing assembly 72 receives a pin 64 located on the ends of the shafts 20, 30, and 40. This pin 64 may be press fit within a pin aperture on the shafts, threaded into receiving apertures, integrally formed with the shaft, or otherwise attached thereto (e.g., welded). Furthermore, the ends of the various shafts may be formed as trunnions for connection to the ring member 74. What is important is that each shaft may be interconnected to opposing apertures 76 of the ring member 74 to form a pivot axis.

Universal joint 62 is interconnected to the second drive shaft 30 about a first pivot axis utilizing first and second opposing bearings 72 and pins 64 that are received within opposing, correspondingly sized pin apertures 34 (only one of which is shown). The opposing pin apertures 34 form a yoke 38 on the end of the second drive shaft 30. When the yoke 38 is interconnected by opposing bearing assemblies 72 to the ring 74, the ring 74 and the second drive shaft 30 are pivotally connected to one another and form a first pivot axis A–A'. Likewise, a set of pin apertures 46 (again, only one of which is shown) form a first yoke 49 on the end of the intermediate shaft 40 that is connected to the remaining two opposing bearing assemblies 72 of the ring 74. This forms a second pivot axis B–B'. As will be appreciated, interconnecting the shafts 30, 40 to the ring 74 may require press fitting the pins 64 within the respective pin apertures 34, 44 or press fitting the bearing caps 68 over the pins 64. In any case, once the joint 62 is interconnected to the second drive shaft 30 and intermediate shaft 40, those shafts 30, 40 are pivotally interconnected and have two rotational degrees of freedom relative to one another. A second set of pin apertures 48 forming a second yoke 49 on the intermediate shaft and pin apertures 24 forming a yoke 26 on the first drive shaft 20 are pivotally interconnected by the ring 74 of first joint 60 in a manner substantially similar to that discussed above. In this regard, the first and second drive shafts 20, 30 are interconnected utilizing two universal joints 60, 62, via an intermediate shaft 40, forming a constant velocity torque transfer device 10.

As noted, the torque transfer device 10 also includes a rigid stabilizing bar 80 as shown in FIGS. 2 and 3. The rigid stabilizing bar 80 contains a central section 82 received within an internal bore 42 of the intermediate shaft 40, a first end section 84 received within an internal bore 22 of the first drive shaft 20, and a second end section 86 received within an internal bore 32 of the second drive shaft 30. In the present embodiment, the rigid stabilizing bar 80 is a single cylindrical metal bar, which is bent in two places. That is, the first and second end sections 84, 86 of the stabilizing bar 80 are bent at angles $\alpha_1$ and $\alpha_2$ relative to the central section 82 of the stabilizing bar 80. In order to provide a constant velocity torque transfer device 10, the first and second end sections 84, 86 are bent such that the bend angles $\alpha_1$ and $\alpha_2$ are equal and in a common plane. See FIG. 2. Furthermore, the end sections 84, 86 are bent relative to the central section 82 at the point where the first and second joints 60, 62 interconnect the first and second drive shafts 20, 30 to the intermediate shaft 40. Accordingly, each section 82, 84 and 86 of the stabilizing bar 80 is received in a corresponding shaft bore 22, 32 and 42 in one of the first, second and intermediate shafts 23, 30 and 40, respectively.

Each shaft bore 22, 32, and 42 includes bearing assemblies to allow the respective shafts 20, 30, and 40 to more easily rotate about the section of the stabilizing bar 80 disposed therein. That is, bearing assemblies may be disposed in the gaps 26, 36, 50 between the inside surface of the bores 22, 32, 42, respectively, and the outside surface of the stabilizing bar 80. The term bearing assemblies includes, without limitation, needle bearings, ball bearings, sleeve bearings, as well as bushing assemblies. In one embodiment, needle bearings are utilized within the bores 22, 32 and 42 to permit enhanced rotation between the shafts 20, 30 and 40 and the stabilizing bar 80.

When the stabilizing bar 80 is disposed within the internal bores 22, 32, 42 of the first and second drive shafts 20, 30 and intermediate shaft 40, the torque transfer device 10 becomes a fixed angle torque transfer device. That is, once the stabilizing bar 80 is integrated into the torque transfer device, the drive shafts 20, 30 are restricted from moving relative to one another except for rotational movement around the end sections 84, 86 of the stabilizing bar 80. In this regard, the internal bores 22, 32, and 42, the stabilizing bar 80 and bearings are sized such that there is little or no lateral or axial movement between the centerline axis of the stabilizing bar sections 82, 84 and 86 and their respective shafts 40, 20 and 30.

As the shafts 20, 30, 40 are in direct contact with the stabilizing bar 80 (i.e. via the bearings disposed within the bores 22, 32 and 42), the stabilizing bar 80 is operable to support forces between the first drive shaft 20 and the second drive shaft 30 that would otherwise be transmitted through the joints 60, 62 utilized to connect the various shafts 20, 30, 40. Accordingly, as the joints 60, 62 do not have to bear these forces, a smaller, more compact torque transfer device can be utilized to transfer power from a source to an application. Furthermore, as first and second end sections 84, 86 of the stabilizing bar 80 interconnect the central section 82 at identical angles at a common plane, the first and second drive shafts 20, 30 are necessarily held in a strict geometric relationship, resulting in a compact fixed angle constant velocity that allows for the torque transfer device 10.

Figure 4A:
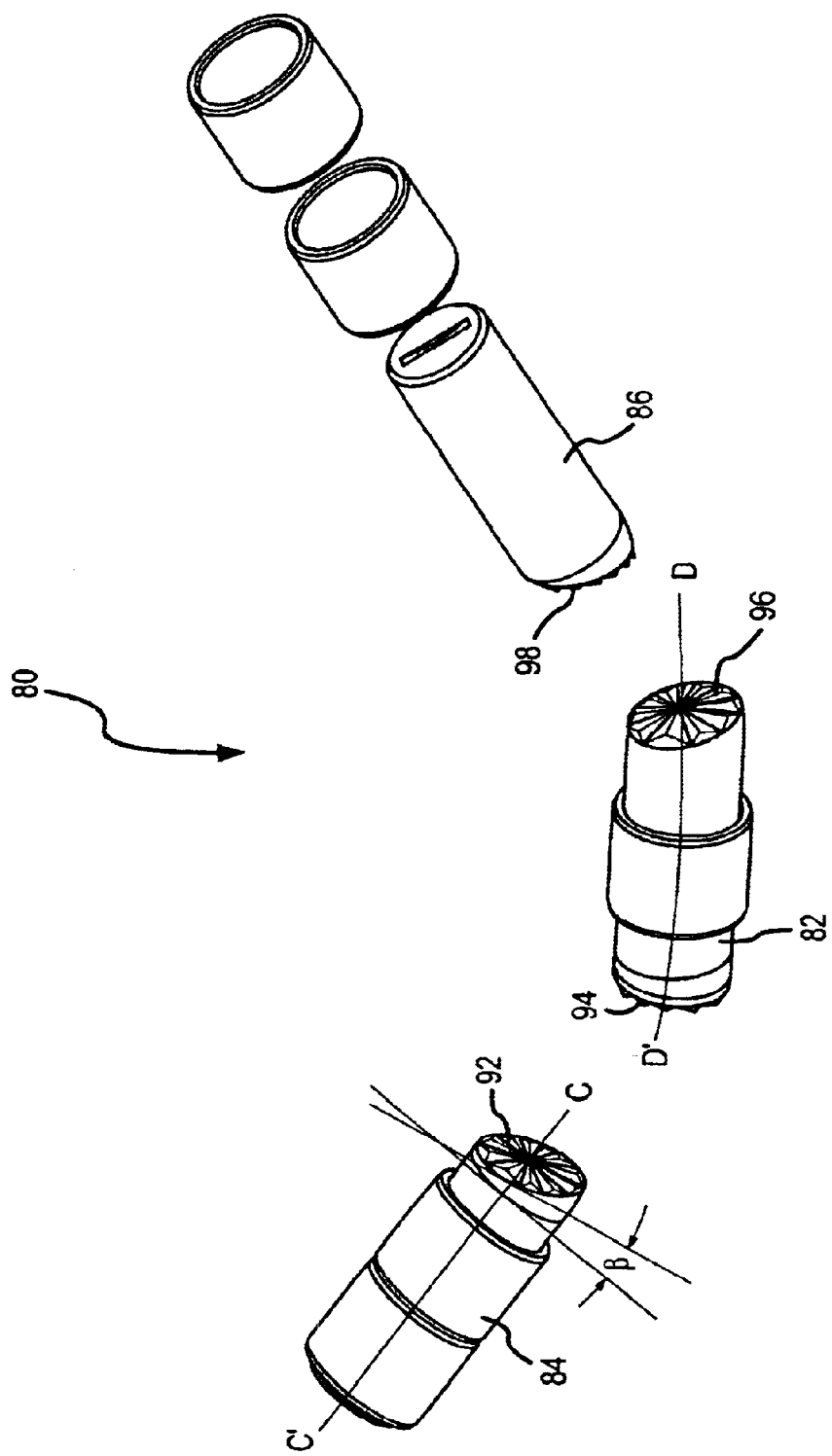
FIGS. 4A and 4B show an adjustable stabilizer for use with the device of FIG. 1.
Figure 4B:
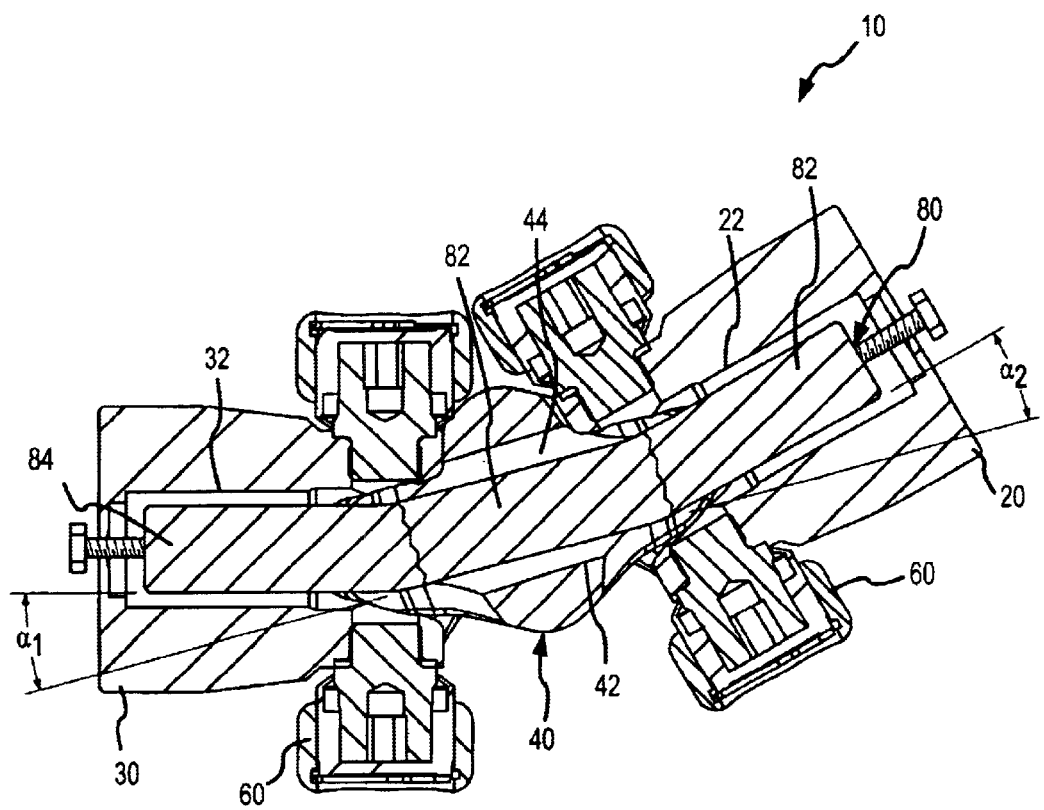

FIGS. 4a and 4b show an alternate embodiment of the rigid stabilizing bar 80 that may be utilized with the torque transfer device 10. In contrast to the stabilizing bar 80 shown in FIGS. 2 and 3, the rigid stabilizing bar 80 shown in FIGS. 4a and 4b is a three-piece sectional stabilizing bar that allows for selectively adjusting the angle of interconnection between the end sections 84, 86 and central section 82. Accordingly, the first and second end sections 84, 86 are removeably interconnectable to the central section 82. As shown, the end sections 84, 86 interconnect to the central section using a compression fit, however, it will be appreciated that other interconnection means may also be utilized (e.g. mechanical fasteners).

When the three-piece stabilizing bar is disposed within the torque transfer device 10, the non connecting end 85, 87 of each end section 84, 86 is engaged with a compression bolt 90 within the respective internal bores 22, 32 of the first and second shafts 20, 30. Since each shaft 20, 30 is interconnected to the intermediate shaft 40, adjusting (e.g., tightening) the compression bolts 90 compresses the end sections 84, 86 against the central section 82. To prevent the sections of the rigid stabilizing bar from rotating relative to one another, the interface surfaces 92–94 and 96–98 are matingly serrated. Accordingly, when compressed together, these serrated interface surfaces 92–94 and 96–98 allow the three-piece stabilizing bar 80 to work in a substantially identical manner as the single piece stabilizing bar discussed in relation to FIGS. 1–3.

In order to selectively adjust the angle of connection between the central section 82 and the end sections 84, 86 the interface surfaces 92, 94, 96 and 98 are each formed at an angle relative to the center axis of their respective stabilizer section 82, 84 and 86. For example, interface surface 92 forms a surface disposed at an angle β relative to a reference plane that is perpendicular to the central axis C–C' of section 84. This angle β may be between about 5° and about 35°. Accordingly, when the interface surface 92 of end section 84 is engaged with a like angled interface surface 94 of the central section 82, the center axes C–C' and D–D' of the two sections may be adjusted to an angle between 0 and 2β relative to one another. That is by rotating the two section 82, 84 before engaging their interface surfaces 92, 94, the angle between these sections 82, 84 may be adjusted. As will be appreciated, in the present embodiment the increment of adjustment between 0 and 2β may depend on the size and/or number of serrations formed on each interface surface 92, 94. Of note, the end sections 84, 86 may be interconnected to the central member 82 at unlike angles to, for example, form a jog between the first and second shafts 20, 30. In any case, the selectively adjustable stabilizing bar 80 allows for increased flexibility in fixing first and second shafts 20, 30 at a desired angle.

Figure 6:
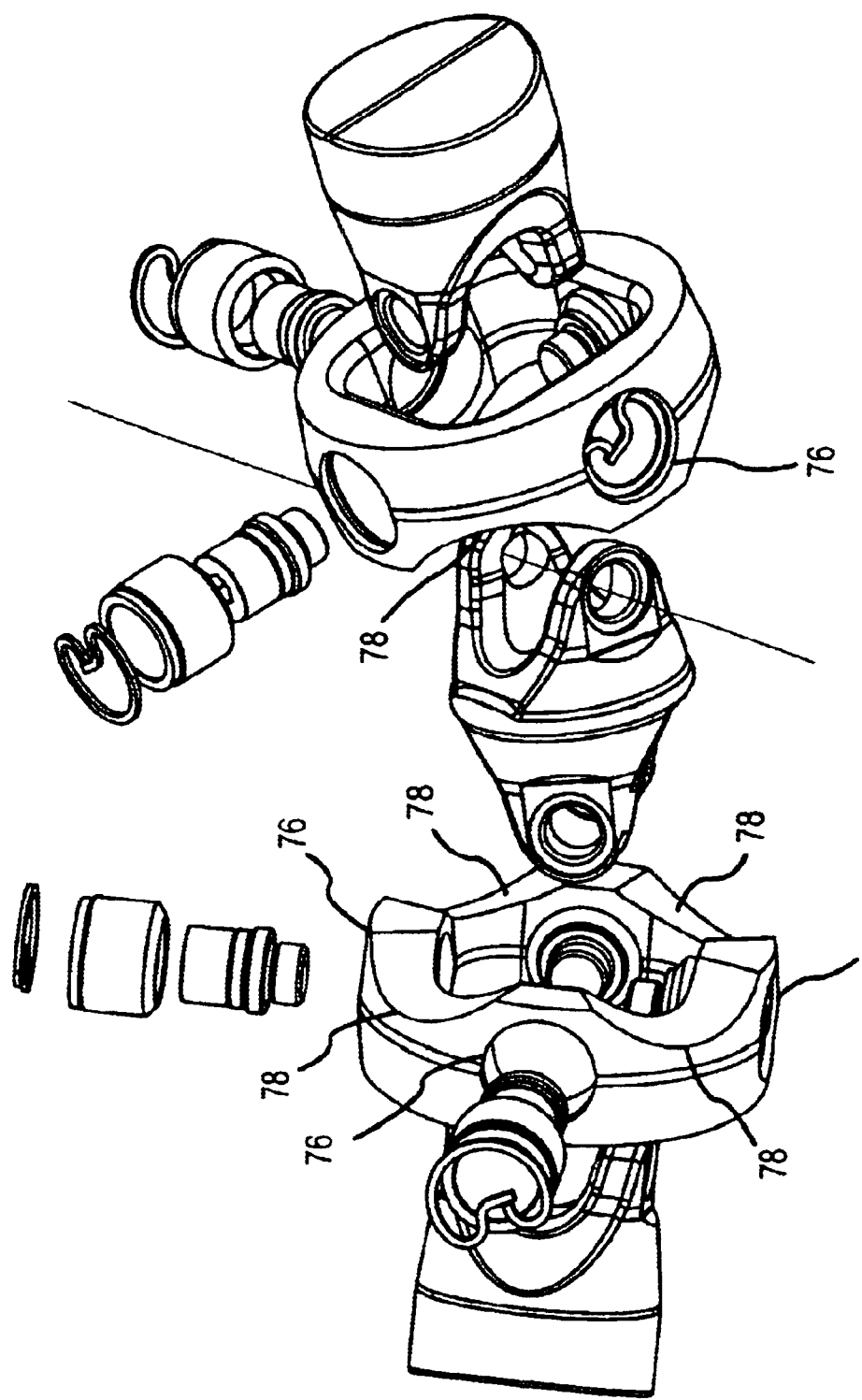
FIG. 6 shows an exploded view of the torque transfer device of FIG. 4.

A second torque transfer device 10 is shown in FIGS. 5 and 6. Although substantially similar to the first embodiment, the second device utilizes a novel intermediate shaft 40 that allows the device 10 to be more compactly formed. As will be understood by those skilled in the art, the ring member 74 of a ring and pin-type universal joint 60 oscillates as two interconnected shafts rotate. In this regard, where two ring-type universal joints and an intermediate shaft are utilized, opposing inside surfaces of the ring members 74 may in some instances oscillate towards one another. Accordingly, this oscillation mandates that the intermediate shaft 40 be of a minimum length to allow the inside surfaces of the ring member 74 of each joint 60, 62 to oscillate towards one another without making contact.

In order to reduce the length of the intermediate shaft 40, the second embodiment of the present invention utilizes an intermediate shaft 40 having a first and second yoke 46, 49 that are offset 45° relative to one another. As shown in FIG. 4 this results in a torque transfer device 10, wherein the four bearing assemblies 72 of each joint 60, 62 are rotated 45° relative to one another as opposed to being aligned as shown in FIG. 1. That is, the first and second joints 60, 62 are offset relative to one another such that the four bearing apertures 76 of each ring 74 are alternated. In order to allow the opposing rings 74 to oscillate more closely to one another, the inside surface of each ring includes four recesses 78 between each bearing aperture 76 that allow the offset bearings from the other ring to be received therein during rotation of the torque transfer device 10. As will be appreciated, this offset allows the first and second joints 60, 62 to be disposed closer to one another, thus resulting in a more compact torque transfer device.

The foregoing description of the present invention has been presented for purposes of illustration and description. Furthermore, the description is not intended to limit the invention to the form disclosed herein. Consequently, variations and modifications commensurate with the above teachings and skill and knowledge of the relevant art are within the scope of the present invention. The embodiments described hereinabove are further intended to explain best modes known of practicing the invention and to enable others skilled in the art to utilize the invention in such, or other, embodiments and with various modifications required by the particular application(s) or use(s) of the present invention. It is intended that the appended claims be construed to include alternative embodiments to the extent permitted by the prior art.

What is claimed is:

1. A fixed angle torque transfer device, comprising:
   a first shaft;
   a second shaft;
   a ring and pin type universal joint having an annular ring pivotally interconnecting said first and second shafts and allowing said first and second shafts to rotate about first and second axes of rotation, wherein said first and second axes are non-aligned and disposed at a fixed angle relative to one another;
   a stabilizer extending between said first and second shafts and having a first section coupled to said first shaft and having a second section coupled to said second shaft, wherein said stabilizer extends into a portion of each of said first and second shafts and wherein said stabilizer maintains said first and second axes of rotation at said fixed angle.

2. The device of claim 1, wherein said first and second sections of said stabilizer are rotationally coupled to said first and second shafts, respectively.

3. The device of claim 1, wherein said first and second sections of said stabilizer extend through an end surface of each of said first and second shafts.

4. The device of claim 3, wherein said first and second shafts further comprise:

first and second bores sized to receive said first and second sections of said stabilizer, respectively.

5. The device of claim 4, wherein said first and second bores extend along centerline axes of said first and second shafts, respectively.

6. The device of claim 4, wherein said first and second bores and said first and second sections of said stabilizer are concentrically aligned.

7. The device of claim 4, further comprises:

bearings disposed about a perimeter of each said bore.

8. The device of claim 7, wherein each said bore, said bearings and each section of said stabilizer are sized to substantially prevent relative movement between a rotational axis of each said shaft and a centerline axis of said section of said stabilizer disposed therein.

9. The device of claim 1, wherein said first and second shafts rotate in first and second fixed axes about said first and second sections of said stabilizer, respectively.

10. The device of claim 1, wherein said fixed angle is greater than about 20°.

11. The device of claim 1, wherein said fixed angle is greater than about 35°.

12. The device of claim 1, wherein said joint comprises one of a universal joint and a ball and cage constant velocity joint.

13. The device of claim 12, wherein said universal joint is a ring and pin type universal joint.

14. The device of claim 1, further comprising:

a third shaft; and a second joint physically interconnecting said third shaft to one of said first and second shafts and allowing said third shaft to rotate about a third axis of rotation.

15. The device of claim 14, wherein said stabilizer further comprises:

a third section coupled to said third shaft, wherein said stabilizer maintains said third shaft and said interconnected one of said first and second shafts at a second fixed angle.

16. The device of claim 15, wherein said first, second and third sections of said stabilizer are removably interconnected.

17. The device of claim 16, wherein said first second and third sections of said stabilizer are interconnectable at selectively adjustable angles.

18. A fixed angle constant velocity torque transfer device, comprising:

a first shaft;

a second shaft;

an intermediate third shaft having a first end physically interconnected to said first shaft via a first joint and a second end physically interconnected to said second shaft via a second joint, said intermediate shaft operable to transfer rotary motion between said first and second shafts;

a stabilizer having a first section coupled to said first shaft, a second section coupled to said second shaft and a third section coupled to said third shaft, wherein each of said first, second and third sections of said stabilizer are partially disposed within a portion of at least one of said first second and third shafts and wherein said stabilizer maintains said first shaft and said third shaft at a first fixed angle and maintains said second shaft and said third shaft at a second fixed angle.

19. The device of claim 18, wherein said first and second fixed angles are equal such that said first and second shafts rotate about first and second axes of rotation disposed at equal angles relative to a third axis of rotation defined by said third shaft.

20. The device of claim 19, wherein said first, second and third axis are in a common plane.

21. The device of claim 18, wherein said first, second, and third sections of said stabilizer are rotationally coupled to said first, second and third shafts, respectively.

22. The device of claim 18, wherein said first, second and third sections of said stabilizer are concentrically disposed within at least a portion of a corresponding one of said first second and third shafts.

23. The device of claim 18, wherein said first, second and third shafts each have an internal bore sized to receive a corresponding one of said first, second and third sections of said stabilizer.

24. The device of claim 23, wherein each bore further comprises:

bearings disposed about a perimeter of said bore.

25. The device of claim 18, wherein said first, second and third sections of said stabilizer are a one-piece unit.

26. The device of claim 18, wherein said first, second and third sections of said stabilizer are removably interconnected.

27. The device of claim 26, wherein said first second and third sections of said stabilizer are interconnectable at selectively adjustable angles.

* * * * *

UNITED STATES PATENT AND TRADEMARK OFFICE
CERTIFICATE OF CORRECTION

PATENT NO.       : 7,037,202 B2                      Page 1 of 1
APPLICATION NO.  : 10/396736
DATED            : May 2, 2006
INVENTOR(S)      : Bigelow et al.

It is certified that error appears in the above-identified patent and that said Letters Patent is hereby corrected as shown below:

Title Page
Section (56), References Cited, insert the following:
--1,948,698  2/1934  Christman ......... 279/16
2,811,025  10/1957  Redard ............. 464/50
3,136,141  6/1964   Donald ............. 464/81 --

Column 10
Line 58, after "extends", insert --through said annular ring and--.

Column 11
Line 25, after "said", delete "joint comprises one of a universal joint and a ball and cage constant velocity joint", and insert --first and second shafts are pivotally interconnected to an inside surface of said annular ring--;
Line 28, after "said", delete "universal joint is a ring and pin type universal joint", and insert --first and second shafts are pivotally connected to for and second pivot axes, respectively, and wherein said first and second pivot axes are perpendicular--;
Line 32, after "second", insert --ring type universal--; and
Line 32, delete "physically", and insert --pivotally--.

Signed and Sealed this

Fifteenth Day of August, 2006

JON W. DUDAS
*Director of the United States Patent and Trademark Office*